United States Patent
Leung et al.

(10) Patent No.: US 10,997,613 B2
(45) Date of Patent: May 4, 2021

(54) CROSS-CHANNEL RECOMMENDATION PROCESSING

(71) Applicant: NCR Corporation, Duluth, GA (US)

(72) Inventors: Ronald Chiwai Leung, Sunnyvale, CA (US); Yehoshua Zvi Licht, Alpharetta, GA (US); Pragya Tripathi, Santa Clara, CA (US); David Allen Turner, Fort Worth, TX (US)

(73) Assignee: NCR Corporation, Atlanta, GA (US)

( * ) Notice: Subject to any disclaimer, the term of this patent is extended or adjusted under 35 U.S.C. 154(b) by 851 days.

(21) Appl. No.: 15/142,028

(22) Filed: Apr. 29, 2016

(65) Prior Publication Data

US 2017/0316435 A1 Nov. 2, 2017

(51) Int. Cl.
| G06F 15/18 | (2006.01) |
| G06Q 30/02 | (2012.01) |
| G06N 20/00 | (2019.01) |
| G06F 16/21 | (2019.01) |
| G06F 16/9032 | (2019.01) |
| G06N 5/04 | (2006.01) |

(52) U.S. Cl.
CPC ....... *G06Q 30/0202* (2013.01); *G06F 16/213* (2019.01); *G06F 16/90324* (2019.01); *G06N 20/00* (2019.01); *G06Q 30/0269* (2013.01); *G06N 5/047* (2013.01)

(58) Field of Classification Search
CPC ................ G06N 99/005; G06N 20/00; G06Q 30/0202–0277
USPC ............................ 705/14, 7.29–7.35; 706/12
See application file for complete search history.

(56) References Cited

U.S. PATENT DOCUMENTS

| 6,836,773 | B2 * | 12/2004 | Tamayo | G06F 16/951 |
| 9,015,277 | B1 * | 4/2015 | Slavin | G06Q 30/0243 709/217 |
| 9,898,467 | B1 * | 2/2018 | Pitzel | G06F 16/215 |
| 10,163,129 | B1 * | 12/2018 | Agarwal | G06N 5/04 |
| 2002/0128938 | A1 * | 9/2002 | Ronald Schofield | G06Q 30/06 705/35 |
| 2002/0161779 | A1 * | 10/2002 | Brierley | G06Q 30/02 |
| 2002/0178008 | A1 * | 11/2002 | Reynar | G06F 17/243 704/272 |
| 2004/0083199 | A1 * | 4/2004 | Govindugari | G06F 17/30303 |
| 2004/0103051 | A1 * | 5/2004 | Reed | G06Q 30/02 705/36 R |
| 2004/0177062 | A1 * | 9/2004 | Urquhart | G06F 16/258 |
| 2005/0159996 | A1 * | 7/2005 | Lazarus | G06Q 30/02 705/7.31 |
| 2010/0100418 | A1 * | 4/2010 | Richter | G06Q 30/02 705/7.32 |
| 2011/0131122 | A1 * | 6/2011 | Griffin | G06Q 40/08 705/35 |

(Continued)

*Primary Examiner* — Jue Louie
(74) *Attorney, Agent, or Firm* — Schwegman, Lundberg & Woessner (57) ABSTRACT

Cross-channel and cross-source data are aggregated into an aggregated data store. Custom segmentation is generated from the aggregated data. A campaign is monitored for the custom segmentation with successes and failures provided as dynamic feedback to a machine learning process that dynamically adjusts the segmentation and the campaign for optimal performance. In an embodiment, a final recommendation is provided identifying a final optimal segmentation and campaign.

20 Claims, 5 Drawing Sheets

(56) References Cited

U.S. PATENT DOCUMENTS

| | | | | |
|---|---|---|---|---|
| 2012/0059707 A1* | 3/2012 | Goenka | ............... | G06Q 30/0242 705/14.41 |
| 2013/0204886 A1* | 8/2013 | Faith et al. | ............ | G06F 17/3012 707/756 |
| 2013/0211913 A1* | 8/2013 | Ross | .................... | G06Q 40/025 705/14.53 |
| 2013/0218640 A1* | 8/2013 | Kidder | ................ | G06Q 30/0254 705/7.33 |
| 2014/0330637 A1* | 11/2014 | Moran | ................ | G06Q 30/0244 705/14.43 |
| 2015/0006295 A1* | 1/2015 | Liu | ......................... | G06Q 50/01 705/14.66 |
| 2015/0058681 A1* | 2/2015 | Lingannapeta | ...... | G06F 11/3495 714/47.3 |
| 2015/0170221 A1* | 6/2015 | Shah | .................. | G06Q 30/0275 705/14.71 |
| 2015/0347593 A1* | 12/2015 | Tsai | ........................ | G06Q 50/01 707/722 |
| 2016/0180245 A1* | 6/2016 | Tereshkov | ......... | G06F 17/30557 706/12 |
| 2016/0267533 A1* | 9/2016 | Seth et al. | .......... | G06Q 30/0255 |
| 2017/0053295 A1* | 2/2017 | Tiell | .................. | G06F 17/30598 |

* cited by examiner

CROSS-CHANNEL RECOMMENDATION PROCESSING

BACKGROUND

A typical individual engages in some form of financial transaction every day; from shopping online with a credit card, to dining at a restaurant, and/or by applying for loans at a bank. Each transaction contains valuable insights about the consumer. However, the electronic data being generated from these transactions are spread across many different disparate systems and disparate sources. Moreover, each individual system only contains partial information about a particular user for which that system has transaction information about.

That is, pieces of information for a given user and that user's transactional behaviors are dispersed across many different disparate systems for numerous user activities with a variety of entities (retail, government, social media, etc.). There is no mechanism to provide a true holistic 360 degree view of any given user available in the industry.

As a result, campaign management by retailers is often not as accurate and successful as it could be. Promotions are not tailored enough to consumer segments for success, and the consumer segments are not as accurately defined as they should be.

Additionally, each consumer now has the ability to transact over multiple communication channels with retailers. Capturing cross-channel transactions even for multiple consumer transactions with a same retailer continues to be problematic in the industry, such that cross-channel transactions between retailers remains just an elusive dream to most retailers.

Therefore, there is a need for deepening the knowledge about each consumer's transactional activity for purposes of improving retail recommendations, promotions, and campaign management.

SUMMARY

In various embodiments, methods and a system for cross-channel recommendation processing are presented.

According to an embodiment, a method for cross-channel recommendation processing is provided. Specifically, in an embodiment, data across disparate communication channels and disparate sources are aggregated into an aggregated and normalized data set. Next, prediction criteria are processed for segmenting the normalized data set into one or more segments. Finally, the prediction criteria and the one or more segments are dynamically adjusted in response to successes and failures tracked for a campaign.

DETAILED DESCRIPTION

Figure 1A:
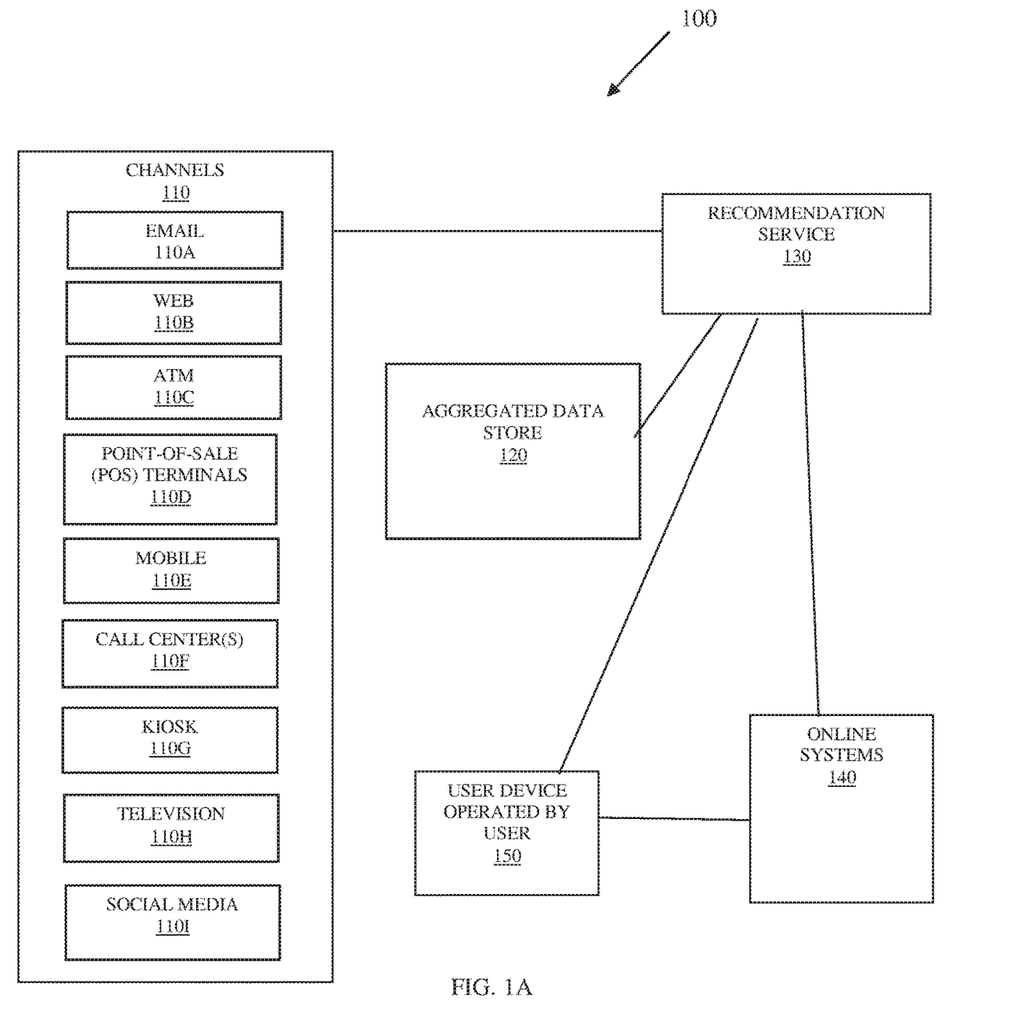
FIG. 1A is a diagram of a system for cross-channel recommendation processing, according to an example embodiment.

FIG. 1A is a diagram of a system 100 for cross-channel recommendation processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the cross-channel recommendation processing presented herein and below.

Moreover, various components are illustrated as one or more software modules, which residing in non-transitory storage and/or hardware memory as executable instructions that when executed by one or more hardware processors perform the processing discussed herein and below.

The techniques, methods, and systems presented herein and below for cross-channel recommendation processing can be implemented in all, or some combination of the components shown in different hardware computing devices having one or more hardware processors.

The system 100 includes electronic communication channels 110, an aggregated data store 120, a recommendation service 130, a variety of online systems 140 (or online services accessible electronically over a network (wired, wirelessly, or a combination of wired and wireless)), and at least one user device operated by a user (or customer of one of the online systems 140 or a consumer to one of the online systems 140).

The channels 110 illustrate electronic communication types that can be associated with one or more different communication devices accessible to an operator (user, customer, consumer, clerk, teller, etc.). The channels 110 capture transactions of the consumer over these different channels 110, such as purchases, entertainment ticket redemption, gaming, social media, and the like. Again, the customer can access one of these channels 110 with their own device 150 or an operator (clerk) may cause the transactions for the customer to be entered on the channels 110.

In the embodiment, illustrated in the FIG. 1, the channels 110 include: an email channel 110A, a web channel 110B, an Automated Teller Machine (ATM) channel 110C, a Point-Of-Sale (POS) terminal channel 110D, a mobile channel 110E (including text messaging, application based, web based channels), a call center channel 110F, a kiosk channel 110G, a television channel 110H, and a social media channel 110I.

The transaction data (purchases, social media transactions, venue ticket redemption, gaming, etc.) may be captured by a variety of online systems 140 or provided from online systems 140 to third-parties for management. In fact, some of this data can be purchased by third-parties for reselling to other marketers, retailers, etc.

The aggregated data store 120 represents an aggregation of this transaction data for users (customers or consumers). The transaction data can include a variety of rich data on the user, such as, and by way of example only, customer name, customer account, customer identifier, credit card used, date and time of transaction, item purchased, retailer where purchased, venue of ticket redemption, type of venue, event held at the venue, restaurant visited, food ordered, and the like. In fact, anything that is captured electronically during a transaction can be captured. This data when natively captured may be in a retail or venue-specific format or may even be unstructured. The aggregated data store 120 represents a normalized data format for the transaction data and represents an aggregation of this data. It is not necessary for the aggregated data store 120 to have all customer aggregated data housed in the aggregated data store 120, such that just those transactions for which the transaction data can be obtained (either through licensing, customer approval, retail agreements, and the like) may be aggregated within the aggregated data store 120. Although, there is no technical impediments to having all such data in the aggregated data store 120 just legal impediments. Therefore, in some cases, the aggregated data store 120 includes all transaction data captured for a customer.

The recommendation service 130 can be a Software as a Service (SaaS) or can be a black box (from the perspective of the online system 140) that integrates the black box into its computing environment. The recommendation service 130 exposes an interface to the online systems 140. The interface permits interactive definition by analysts of the online systems 140 for defining custom transactional data aggregations. For example, each channel 110 and each retailer that natively captures transaction data may have a schema for defining the structure of transactional data or transactional records. The schema may define component elements of the transaction by the placement (field-driven transactional records with or without separating characters) or identification (tagged or tokenized component elements) within the transactional records. In some cases, the schema may be a grammar for recognizing the component elements through parsing of regular expression statements; in such cases, the transactional data may be unstructured in its native source of channel 110.

The recommendation service 130 through the exposed interface permits the analysts of the online system to map schema component elements across (cross and disparate) sources and channels to defining an aggregation schema that the recommendation service provides to the recommendation service 130 then uses to mine through the channels 110 and sources of transactional data for purposes of creating a custom defined data aggregation in the aggregated data store 120. The aggregation schema and the custom defined data aggregation of cross-channel and cross-source transactional data now represents a normalized version of aggregated transactional data that is accessible from the aggregated data store 120 through the interface of the recommendation service.

Next, the interface of the recommendation service 130 permits the analyst to define conditions for making predictions about a customer segment that is believed to be response to a given recommendation or promotion. Such as, conditions defining attributes or transactions for customer relevant to shopping at a specific retailer, buying specific items, number of specific items bought over a given time period, money spent on gaming, and the like. This defines a prediction criteria for identifying those customers from the customized aggregated transactional data that are believed to be responsive to a particular product or service recommendation or promotion that is part of a campaign being developed by the analyst through the interface between that analyst's online system 140 and the recommendation service 130.

In some embodiments, the campaign may include multiple target customer segment categories to which any given consumer can be placed into based on enforcing the prediction criteria against the aggregated transactional data, such conditions for placement of any given customer segment category for the campaign can also be defined through the prediction criteria.

Next, the analyst through the interface of the online system 140 to the recommendation service 130 can identify the promotion or promotions being recommended to the customer segment(s) for the campaign of the analyst. This can be done through providing a link to an image representing the promotion(s) for which the recommendation service can use (the image can be a Quick Response (QR) code) and or providing text that provides a description of the promotion(s) as well as metadata associated with the promotion (such as conflict redemption conditions, expiry conditions, a unique promotion identifier for identifying the promotion, and the like).

The aggregated transaction data is then processed by the recommendation service 130 in a training mode of operation as the promotions are given to the customer segments of the campaign for purposes of machine learning what unique attributes or circumstances exist for those customers within the customer segments actually redeem the promotions (indicating a success) and for purposes of machine learning what unique attributes or circumstances exist for those customers within the customer segments that do not redeem the promotions (indicating a failure). The attributes can be components of those aggregated transaction records that show a correlation with one another (can include channel 110 used for a given transaction based on a channel identifier in a transaction record for that given transaction) and the attributes can be profile information for customers identified in the aggregated transaction records, such as age, gender, zip code of residence, household size, household income, employment status, etc. The circumstances can include external available data obtainable by the recommendation service, such as retail traffic load at a retailer when a particular transaction was made, inventory of the item relevant to the promotion at the retailer, a major news event occurring when the promotion was offered (may be identified by the analyst through the interface to the recommendation service), such as an earthquake, a terrorist event, a weather event, a sporting event, etc., and others.

The results of successes and failures are noted based on the correlated attributes and/or circumstances and provided to the recommendation service 130 during the training mode. It is noted, that redemptions can be provided by the online systems 140 through the interface indicating a redemption occurred along with the promotion identifier (which the integration service links to the campaign and a customer in the aggregated transaction records). Also, the delivery of the recommendation or promotion may occur through POS terminals 110D (self-service of clerk manned) or may occur though the recommendation service directly delivering the promotion to the user device 150 in manners defined through the interface by the analyst. In fact, how the promotion is delivered (through the retailer or the recommendation service 130 and the channel 110 used for promotion deliver) can be an attribute within the promotion delivery transaction (transaction data) or a circumstance noted by either the recommendation service 130 or the analyst through the interface between the online system 140 and the recommendation service 130.

At the conclusion of the training mode, the recommendation service 130 provides a final recommendation for the campaign based on the machine learning, such as by adjusting the customer segmentation and identifying those attributes and circumstances having a strongest correlation for success rates of the campaign for the promotion(s). The recommendation service 130 may also perform aggregation again based on these success correlations for attributes deriving a new aggregation of transaction records from the channels 110 with new segmentation and provide access to both back to the analysts through the interface. New aggregations may be needed because a success correlation for an attribute may not have been one of the prediction criteria defined by the analyst when defining the customer segmentation, such that customers associated with customer segmentation were never originally provided the promotion for the campaign.

In an embodiment, and where authorized through the interface by the analysts, the recommendation service may continually and dynamically adjust segmentation and aggregations based on new discovered correlations that exceed success rates beyond a given threshold (perhaps authorized by the analyst) for purposes of continually running a campaign that is dynamically adjusted until such time as a terminating condition defined by the analyst or manually instituted by the analyst is received by the recommendation service 130.

One now appreciates how a holistic and 360 degree view of customers can be aggregated, segmented for a campaign, tracked and modified in a real time and dynamic fashion for purposes of improved campaign management, promotion success, and customer relationship management (CRM).

In addition, the above techniques can be used to target a specific individual based on that individual's cross-transactional and cross-enterprise transactional history. That is, when a campaign is dynamically adjusted for a promotion so as to include a new individual (based on a transaction that the user may be presently performing in view of that user's transactional history) that new individual can be targeted in real time for the promotion of the campaign.

It is to be noted that the processing discussed above with the system 100 and below with other embodiments of the invention can be used in any application for making an optimal decision through custom aggregation of cross-channel and cross-source data processed by a machine learning process using initial prediction criteria where dynamic feedback of results are fed to the machine learning process and the prediction criteria is continuously optimized; resulting in a final optimized decision. Therefore, in some embodiments, the techniques herein can be utilized in a wide-variety of applications, such as but not limited to optimizing dynamic network resource configurations for optimal bandwidth, processor load, memory utilization, etc.; business investment decisions, health care recommendations, and many others areas.

Figure 1B:
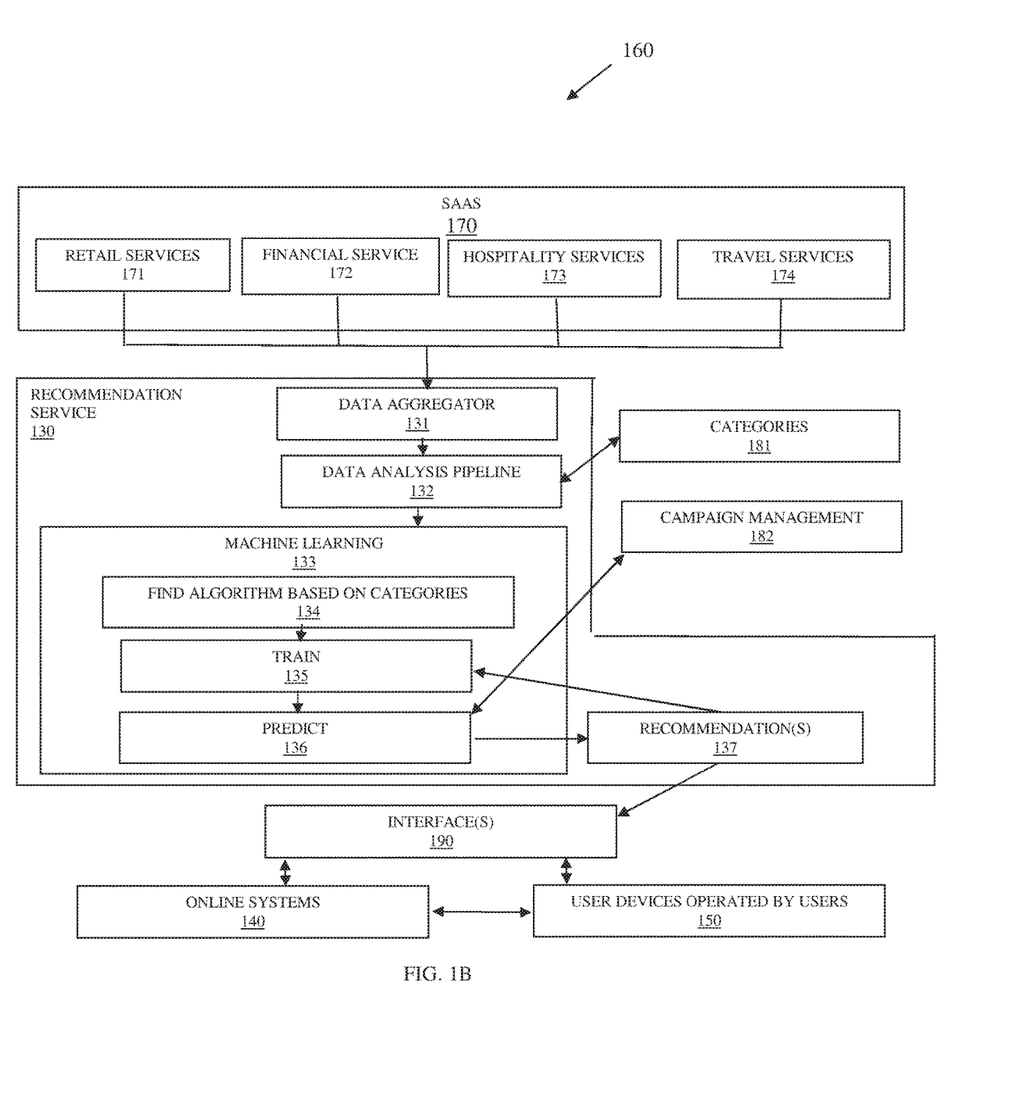
FIG. 1B is a diagram a sample retail-based architecture for cross-channel recommendation processing, according to an example embodiment.

FIG. 1B is a diagram a sample retail-based architecture 160 for cross-channel recommendation processing, according to an example embodiment.

The architecture 160 includes a plurality of SaaS products accessible online 170, segmentation categories 181, campaign management 182, the recommendation service 130 (albeit with a slightly different arrangement and more detail from FIG. 1A), interfaces 190, online systems 140, and user devices operated by users 150.

The SaaS products 170 include (in this sample embodiment) retail services 171, financial services 172, hospitality services 173, and travel services 174.

The integration service 130 includes sub-processing modules that include: a data aggregator 131, a data analysis pipeline 132, a machine learning module 133 (having a find algorithm based on categories module 134, a training module 135, and a prediction module 136), and a recommendation module 137.

The services 170 include data sources that span multiple channels 110. The channels 110 can vary within a particular service 170 and/or can vary across the services 170. Moreover, as discussed above, the data is transactional data for transactions of users occurring with the services 170 over cross-channels and cross-sources.

The interfaces 190 can be Representational State Transfer (Restful) interfaces exposed by the recommendation service 130 for interfacing with the online systems 140.

The exposed interface 190 is interacted with by analysts of the online systems 140 for defining and mapping schemas of the transactional data into an aggregated set of normalized transaction data. The data aggregator 131 processes the aggregated schema and mapping to obtain the actual aggregated set of normalized transaction data.

Moreover, the exposed interface 190 is interacted with by analysts of the online systems for defining prediction criteria and assigning customers identified from the aggregated set of normalized transaction data into categories (segments). The prediction criteria and assignment conditions are processed against the aggregated set of normalized transaction data by the data analysis pipeline into the categories 181.

Next, the exposed interface 190 is interacted with by the analysts of the online systems to define a promotion or promotions for the categories 181 as identified in a campaign associated with a campaign management module 182. It is noted that the actually categories 181 and campaign management 182 may reside external to the recommendation service 130 and in some cases may be part of the analysts' online systems 140.

The machine learning module 133 then finds an algorithm based on the segmentation 134 to identify correlations in attributes or circumstances surrounding successes and failures with the promotion(s) of the campaign based on feedback from the online systems 140. The training module 135 is trained with the successes and failures and predictions about the categories and correlated attributes and circumstances are made as recommendations 137 to the online systems 140 through the exposed interfaces 190. This processing can iterate until an optimal set of criteria (segmentation and prediction criteria) is made as a final recommendation 137 for the campaign.

Additionally, the segmentation and prediction criteria for the categories 181 can continually and dynamically run the machine learning for an ongoing campaign until a terminating condition is met (as defined or as instructed by the analysts through the exposed interfaces 190 to the online systems 140).

These and other embodiments are no discussed with reference to the FIGS. 2-4.

Figure 2:
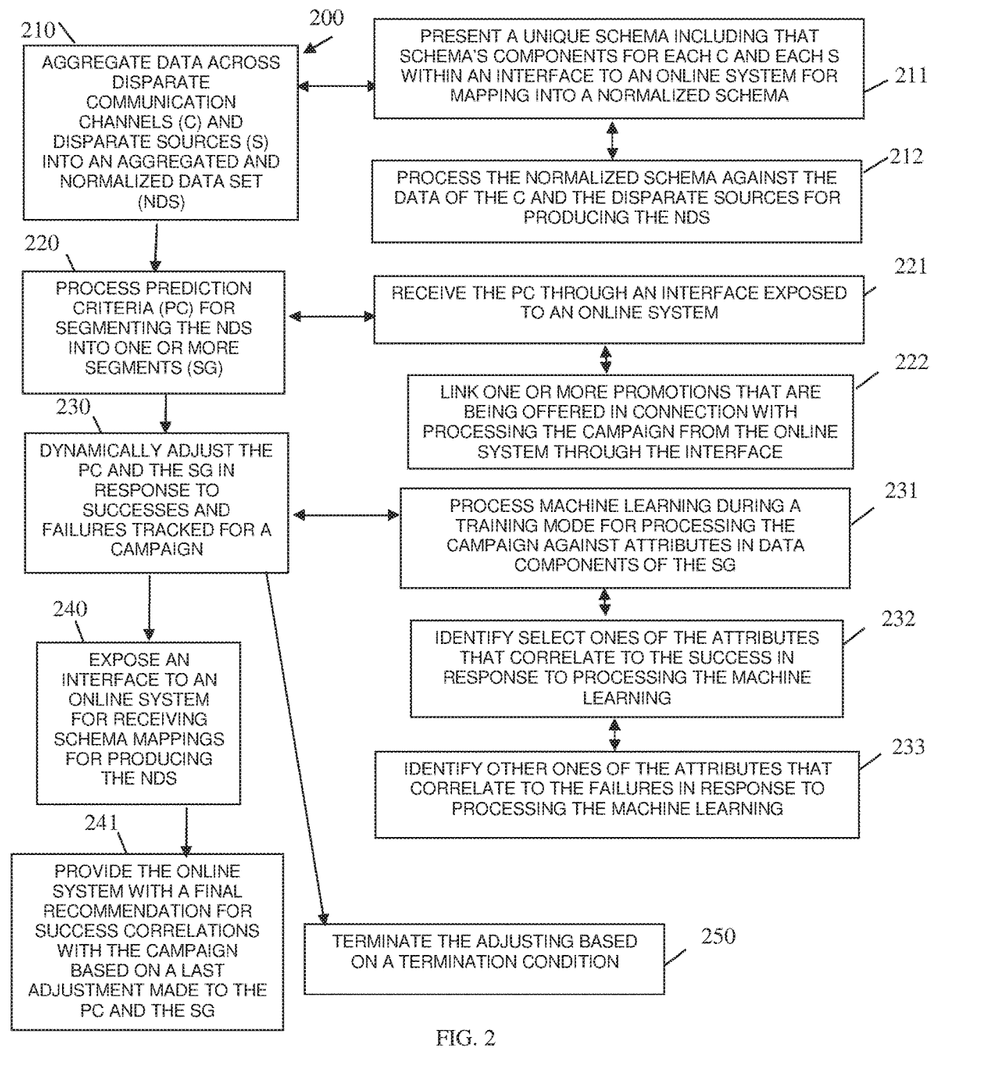
FIG. 2 is a diagram of a method for cross-channel recommendation processing, according to an example embodiment.

FIG. 2 is a diagram of a method 200 for cross-channel recommendation processing, according to an example embodiment. The software module(s) that implements the method 300 is referred to as a "recommendation manager." The recommendation manager is implemented as executable instructions programmed and residing within memory and/or a non-transitory computer-readable (processor-readable) storage medium and executed by one or more hardware processors of a hardware computing device. The processors of the device that executes the recommendation manager are specifically configured and programmed to process the recommendation manager. The recommendation manager has access to one or more networks during its processing. The networks can be wired, wireless, or a combination of wired and wireless.

In an embodiment, the device that executes the recommendation manager is a server.

In an embodiment, the device that executes the recommendation manager is a device that executes an existing online system 140.

In an embodiment, the device that executes the recommendation manager is a cloud processing environment having a variety of hardware devices logically organized as a single processing environment.

In an embodiment, the recommendation manager is the recommendation service 130.

At 210, the recommendation manager aggregate data across disparate communication channels and disparate data storage sources into an aggregated and normalized data set.

In any of the embodiments that follow, the data represents transactional data for transactions performed with retailers, social media entities, organizations, and/or governmental agencies. In an embodiment, the transactional data is any of the transaction data types discussed above with reference to the FIG. 1A.

According to an embodiment, at 211, the recommendation manager presents a unique schema that includes that schema's components (discrete data elements) for each disparate communication channel and data source within an interface exposed by the recommendation manager to an online system for mapping into a normalized schema. In an embodiment, any of the techniques presented above with respect to the FIGS. 1A and 1B may be used for creating the normalized schema.

In an embodiment of 211 and at 212, the recommendation manager processes the normalized schema against the data of the cross channels and cross data sources for producing the aggregated and normalized data set.

At 220, the recommendation manager processes prediction criteria for segmenting the aggregated and normalized data set into one or more segments. In an embodiment, each record of the data set represents a particular transaction and corresponding transaction data for a particular customer occurring over one of the cross-channels and recorded in one of the cross data sources.

In an embodiment, at 221, the recommendation manager receives the prediction criteria through an interface exposed to an online system. In an embodiment, the interface is a Restful interface. In an embodiment, the interface is the interface 190.

In an embodiment of 221 and at 222, the recommendation manager links one or more promotions that are being offered in connection with processing a campaign from the online system through the interface.

At 230, the recommendation manager dynamically adjusts/modifies the prediction criteria and the segments in response to successes and failures tracked and/or reported for a campaign.

In an embodiment, at 231, the recommendation manager processes machine learning during a training mode for processing the campaign against attributes in data components of the segments' corresponding data.

In an embodiment of 231 and at 232, the recommendation manager identifies select ones of the attributes that correlate to the successes in response to processing the machine learning.

In an embodiment of 232 and at 233, the recommendation manager identifies other ones of the attributes that correlate to the failures in response to processing the machine learning.

In an embodiment, at 240, the recommendation manager exposes an interface to an online system for receiving schema mappings processed in producing the aggregated and normalized data set.

In an embodiment of 240 and at 241, the recommendation manager provides the online system with a final recommendation for success correlations with the campaign based on a last adjustment made to the prediction criteria and the segments.

According to an embodiment, at 250, the recommendation manager terminates the adjustment processing of 230 based on a termination condition. This can be a dynamically determined condition during execution of the campaign, a pre-defined elapsed period of time since the adjustment processing 230 was initiated, a pre-defined number of recorded successes noted for the campaign, a pre-defined number of delivered promotions to customers in connection with the campaign, or a manual termination instruction received through an interface to the online system.

Figure 3:
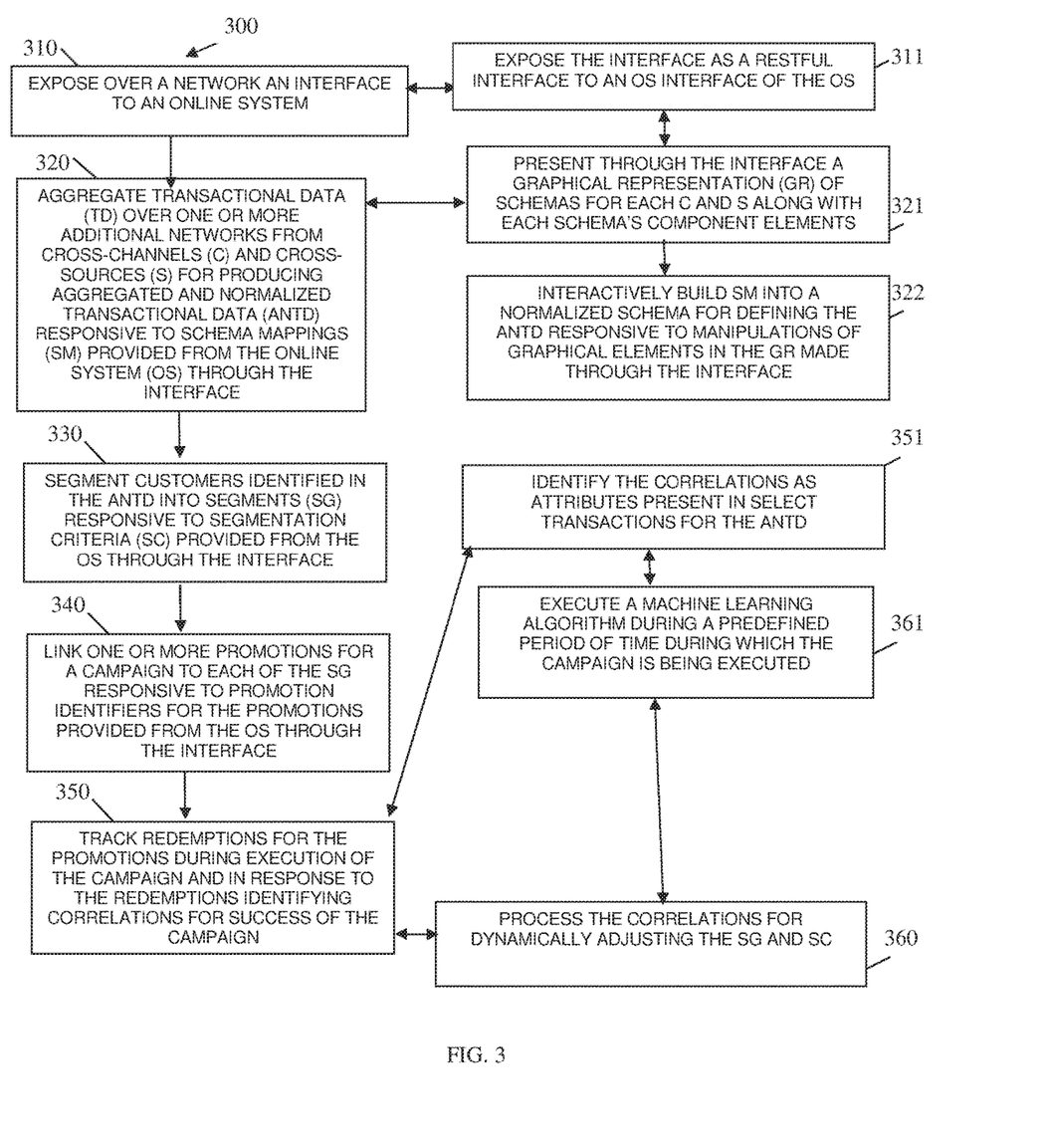
FIG. 3 is a diagram of another method for cross-channel recommendation processing, according to an example embodiment.

FIG. 3 is a diagram of another method 300 for cross-channel recommendation processing, according to an example embodiment. The software module(s) that implements the method 300 is referred to as a "recommendation service." The recommendation service is implemented as executable instructions programmed and residing within memory and/or a non-transitory computer-readable (processor-readable) storage medium and executed by one or more hardware processors of a hardware device. The processors of the device that executes the recommendation service are specifically configured and programmed to process the recommendation service. The authentication service has access to one or more networks during its processing. The networks can be wired, wireless, or a combination of wired and wireless.

In an embodiment, the device that executes the recommendation service is a server.

In an embodiment, the device that executes the recommendation service is a device that executes an existing online system 140.

In an embodiment, the device that executes the recommendation service is a cloud processing environment.

In an embodiment, the recommendation service is the authentication service 130.

In an embodiment, the recommendation service is the recommendation manager of the FIG. 2.

In an embodiment, the recommendation service is a combination of the recommendation service 130 and the recommendation manager of the FIG. 2.

At 310, the recommendation service exposes an interface over a network to an online system. In an embodiment, the interface is the interface 190.

In an embodiment, at 311, the recommendation service exposes the interface as a Restful interface to an online system interface of the online system.

At 320, the recommendation service aggregates transactional data over one or more additional networks from cross-channels and cross-sources (data repositories or data storage services) for producing aggregated and normalized transactional data for transactions. The aggregated and normalized transaction data is aggregated in response to schema mappings for the cross-channels and cross-sources provided from the online system through the exposed interface to the recommendation service.

In an embodiment of 311 and 320, at 321, the recommendation service presents through the interface a graphical representation of schemas for each cross-channel and cross-source along with each schema's component elements (attributes).

In an embodiment of 321 and at 322, the recommendation service interactively builds the schema mappings into a normalized schema for defining the aggregated and normalized transactional data in response to manipulations of the graphical elements in the graphical representation made through the interface.

At 330, the recommendation service segments customers identified in the aggregated and normalized transactional data into segments in response to segmentation criteria provided from the online system through the exposed interface.

At 340, the recommendation service links one or more promotions for a campaign to each of the segments in response to promotion identifiers for the promotions provided from the online system through the exposed interface.

At 350, the recommendation service tracks or receives notifications for redemptions made on the promotions during execution of the campaign and in response to the redemptions dynamically identifies correlations for successes of the campaign.

In an embodiment, at 351, the recommendation service identifies the correlations as attributes (distinct components of transactions identified as the successes within the aggregated and normalized transactional data), which are present in select transactions for the aggregated and normalized transactional data.

At 360, the recommendation service processes the correlations for dynamically adjusting the segments and the segmentation criteria.

Figure 4:
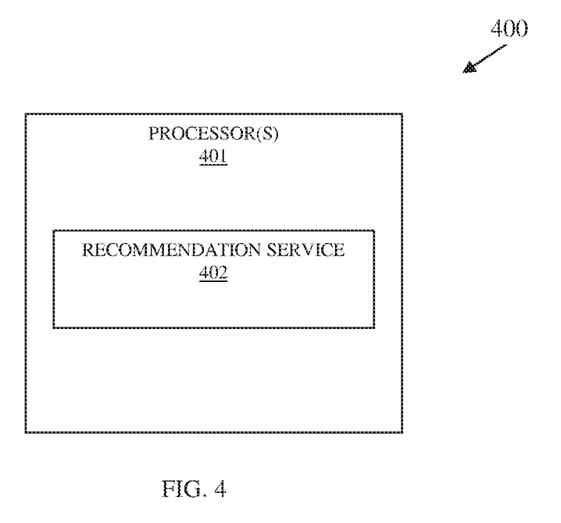
FIG. 4 is a diagram of a system for cross-channel recommendation processing, according to an example embodiment.

FIG. 4 is a diagram of a system 400 for cross-channel recommendation processing, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all, any, or some combination of the processing discussed above with the FIGS. 1A-1B and 2-3.

The system 400 includes at least one hardware processor 401 and a recommendation service 402.

In an embodiment, the hardware processor 401 is part of a server.

In an embodiment, the hardware processor 401 is a device that executes an existing online system 140.

In an embodiment, the hardware processor is part of a cloud processing environment.

The recommendation service 402 is configured to: execute on the processor 401, aggregate data across cross-channels and cross sources, segment the data into categories, monitor successes and failures of a campaign for each of the categories, dynamically adjust criteria for segmenting the data into the categories during execution of the campaign, and provide a final adjustment to the criteria as a recommendation for the campaign.

In an embodiment, the data is transactional data having a plurality of transactions, each transaction identifying a customer performing a particular transaction over one of the cross-channels and recording in one of the cross-sources.

In an embodiment, the segments are customer segments identifying a select group of customers that are to receive a promotion issued from a particular retailer, wherein the particular retailer interacts with the recommendation service 402 through an interface exposed by the recommendation service 402 to an online system being interacted with by an analyst of the particular retailer.

In an embodiment, the recommendation service 402 is further configured to processing instructions received through an interface to an online system that provides directives for aggregating the data, segmenting the data, and identifying the successes and the failures for the campaign.

In an embodiment, the recommendation service 402 is configured to process as one of: a SaaS, a cloud-based service, a server-based service, and a service local to an online system that executes the campaign.

In any of the above-mentioned references to an exposed interface, the interface is interacted with by an analyst operating a device of the above-mentioned online systems.

In any of the above-mentioned references to an exposed interface, some or all of the interface is interacted with through API calls made by an automated application program or script executing on a device of the above-mentioned online systems.

In an embodiment, the recommendation service 402 is the recommendation service 130.

In an embodiment, the recommendation service 402 is the recommendation manager of the FIG. 2.

In an embodiment, the recommendation service 402 is the recommendation service 130 of the FIG. 3.

In an embodiment, the recommendation service 402 is deployed as a SaaS over a network.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    aggregating, by executable instructions that execute on a hardware processor of a server from a non-transitory computer-readable storage medium, data across disparate communication channels and disparate sources into an aggregated and normalized data set, wherein the data is transaction data for transactions processed by enterprises for customers, wherein aggregating further includes processing a schema to mine sources of the data across the disparate communication channels, wherein the schema defines a structure of the data and component elements of the transactions, and identifying the component elements by using a grammar that represents the schema and recognizing component elements of the data through parsing of regular expression statements, wherein the disparate communication channels comprise the transaction data for the transactions performed with retailers, social media entities, organizations, and government agencies;

processing, by the executable instructions, prediction criteria to segment the normalized data set into one or more segments, wherein processing further includes receiving conditions that define the prediction criteria as: attributes of the transactions relevant to a specific retailer, specific items associated with the transactions, a specific number of the specific items bought over a given time period, circumstances that are internal and external to the specific retailer, and money spent on gaming, wherein the circumstances comprising current retail traffic at the specific retailer, inventory of the specific items at the specific retailer, a major news event, and a weather event; and dynamically adjusting, by the executable instructions, the prediction criteria and the one or more segments in response to successes and failures tracked for a campaign and continuously iterating back to and adjusting the aggregating during the campaign based on dynamically discovered correlations between the prediction criteria and the successes and the failures.

2. The method of claim 1 further comprising, exposing, by the executable instructions, an interface to an online system for receiving schema mappings of the schema and producing the normalized data set.

3. The method of claim 2 further comprising, providing, by the executable instructions, the online system with a final recommendation for success correlations with the campaign based on a last adjustment made to the prediction criteria and the one or more segments.

4. The method of claim 1 further comprising, terminating, by the executable instructions, the adjusting based on a termination condition.

5. The method of claim 1, wherein aggregating further includes presenting a unique schema including that schema's components for each disparate communication channel and each disparate source within an interface to an online system for mapping into the schema.

6. The method of claim 5, wherein presenting further includes processing the schema against the data of the disparate communication channels and the disparate sources for producing the normalized data set.

7. The method of claim 1, wherein processing further includes receiving the prediction criteria through an interface exposed to an online system.

8. The method of claim 7, wherein receiving further includes linking one or more promotions that are being offered in connection with processing the campaign from the online system through the interface.

9. The method of claim 1, wherein dynamically adjusting further includes processing machine learning during a training mode for processing the campaign against attributes in data components of the segments.

10. The method of claim 9, wherein processing further includes identifying select ones of the attributes that correlate to the successes in response to processing the machine learning.

11. The method of claim 10, wherein processing further includes identifying other ones of the attributes that correlate to the failures in response to processing the machine learning.

12. A method, comprising:

exposing, by executable instructions that execute on a hardware processor of a server from a non-transitory computer-readable storage medium over a network an interface to an online system;

aggregating, by the executable instructions, transactional data over one or more additional networks from cross-channels and cross-sources for producing aggregating and normalized transactional data responsive to schema mappings provided from the online system through the interface to a schema, wherein aggregating further includes using a grammar representing the schema and recognizing component elements of the transaction data through parsing regular expression statements, wherein the cross-channels and the cross-sources comprise the transaction data for transactions performed with retailers, social media entities, organizations, and government agencies;

segmenting, by the executable instructions, customers identified in the aggregated and normalized transactional data into segments responsive to segmentation criteria provided from the online system through the interface, wherein the segmentation criteria include conditions representing: attributes of the transactional data relevant to a specific retailer, specific items associated with the transactional data, a specific number of the specific items bought over a given time period, circumstances that are internal and external to the specific retailer, and e money spent on gaming, wherein the circumstances comprising current retail traffic at the specific retailer, inventory of the specific items at the specific retailer, a major news event, and a weather event;

linking, by the executable instructions, one or more promotions for a campaign to each of the segments responsive to promotion identifiers for the promotions provided from the online system through the interface;

tracking, by the executable instructions, redemptions for the promotions during execution of the campaign and in response to the redemptions identifying correlations for successes of the campaign; and processing, by the executable instructions, the correlations for dynamically adjusting the segments and segmentation criteria, and continuously iterating back to and adjusting the aggregating during the campaign based on dynamically discovered correlations between the segmentation criteria and the successes and failures of the campaign.

13. The method of claim 12, wherein exposing further includes exposing the interface as a Representational State Transfer (Restful) interface to an online system interface of the online system.

14. The method of claim 13, wherein aggregating further includes presenting through the interface a graphical representation of source schemas for each cross-channel and cross-source along with each source schema's component elements.

15. The method of claim 14 further comprising, interactively building, by the executable instructions, the schema mappings into the schema for defining the aggregated and normalized transactional data responsive to manipulations of graphical elements in the graphical representation made through the interface.

16. The method of claim 12, wherein tracking further includes identifying the correlations as attributes present in select transactions for the aggregated and normalized transactional data.

17. The method of claim 16, wherein processing further includes executing a machine learning algorithm during a predefined period of time during which the campaign is being executed.

18. A system, comprising:
a hardware processor;
a non-transitory computer-readable storage medium having executable instructions representing a recommendation service;
the recommendation service when executed by the hardware processor from the non-transitory computer-readable storage medium cause the hardware processor to:
aggregate data across cross-channels and cross-sources by using a grammar that represents a schema and recognizing component elements of transaction data identified in the data through parsing regular expression statements, wherein the cross-channels and cross-sources comprise the transaction data for transactions performed with retailers, social media entities, organizations, and government agencies;
segment the data into categories based on conditions representing: attributes of the transactional data relevant to a specific retailer, specific items associated with the transactional data, a specific number of the specific items bought over a given time period, circumstances that are internal and external to the specific retailer, and money spent on gaming, wherein the circumstances comprising current retail traffic at the specific retailer, inventory of the specific items at the specific retailer, a major news event, and a weather event;
monitor successes and failures of a campaign for each of the categories;
dynamic adjust criteria for segmenting the data into the categories during execution of the campaign and continuously iterating back to and adjusting aggregation of the data during the campaign based on dynamically discovered correlations between the conditions and the successes and the failures of the campaign; and
provide a final adjustment to the criteria as a recommendation for the campaign.

19. The system of claim 18, wherein the recommendation service is when executed by the hardware processor from the non-transitory computer-readable storage medium further causes the processor to: process instructions received through an interface to an online system that provides directives for aggregating the data, segmenting the data, and identifying the successes and the failures.

20. The system of claim 18, the recommendation service is one of: a Software as a Service (SaaS), a cloud-based service, a server-based service, and a service local to an online system that executes the campaign.

* * * * *